(12) United States Patent
Kobayashi

(10) Patent No.: US 11,558,541 B2
(45) Date of Patent: Jan. 17, 2023

(54) INTERCHANGEABLE LENS AND ACCESSORY

(71) Applicant: CANON KABUSHIKI KAISHA, Tokyo (JP)

(72) Inventor: Koya Kobayashi, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/358,288

(22) Filed: Jun. 25, 2021

(65) Prior Publication Data

US 2022/0014671 A1 Jan. 13, 2022

(30) Foreign Application Priority Data

Jul. 13, 2020 (JP) .............................. JP2020-119885

(51) Int. Cl.
*H04N 5/232* (2006.01)
*G03B 17/14* (2021.01)

(52) U.S. Cl.
CPC ......... *H04N 5/23209* (2013.01); *G03B 17/14* (2013.01)

(58) Field of Classification Search
CPC ............................. H04N 5/23209; G03B 17/14
See application file for complete search history.

(56) References Cited

U.S. PATENT DOCUMENTS

| | | | | |
|---|---|---|---|---|
| 5,382,994 A * | 1/1995 | Naito | ....................... | G03B 7/20 396/530 |
| 5,731,920 A * | 3/1998 | Katsuragawa | ......... | G03B 17/14 396/300 |
| 8,403,574 B2 * | 3/2013 | Okada | .................. | G03B 17/565 396/530 |
| 8,412,034 B2 * | 4/2013 | Okada | ..................... | G03B 17/14 396/530 |
| 2011/0103789 A1 * | 5/2011 | Honjo | ................. | H04N 5/23209 348/335 |
| 2011/0229114 A1 * | 9/2011 | Okada | .................. | G03B 17/565 396/71 |
| 2011/0229115 A1 * | 9/2011 | Okada | .................... | G03B 17/14 396/71 |
| 2018/0224721 A1 * | 8/2018 | Pan | ....................... | G03B 17/565 |
| 2018/0352138 A1 * | 12/2018 | Takanashi | ............ | G03B 17/565 |
| 2018/0352140 A1 * | 12/2018 | Tsukamoto | .............. | G03B 7/20 |
| 2019/0387156 A1 * | 12/2019 | Wada | .................. | H04N 5/23209 |
| 2020/0026153 A1 * | 1/2020 | Kawai | ..................... | G03B 17/02 |
| 2020/0026154 A1 * | 1/2020 | Kawai | ................... | G03B 17/565 |

(Continued)

FOREIGN PATENT DOCUMENTS

| | | |
|---|---|---|
| JP | 2002372662 A | 12/2002 |
| JP | 2014134807 A | 7/2014 |
| WO | 2017068906 A1 | 4/2017 |

*Primary Examiner* — Cynthia Segura
(74) *Attorney, Agent, or Firm* — Rossi, Kimms & McDowell LLP

(57) ABSTRACT

An interchangeable lens communicable with an accessory and an image pickup apparatus includes a communicator configured to communicate with the accessory and the image pickup apparatus, and a memory configured to store information corresponding to a type of accessory. The communicator acquires information on the type of the accessory by communicating with the accessory, and transmits optical information corresponding to the type of the accessory to the image pickup apparatus.

6 Claims, 5 Drawing Sheets

(56) References Cited

U.S. PATENT DOCUMENTS

2020/0363605 A1\* 11/2020 Saito ............... G02B 7/022
2021/0136286 A1\* 5/2021 Kaburagi ............ G03B 17/14
2021/0168278 A1\* 6/2021 Takanashi ....... H04N 5/232122

\* cited by examiner

INTERCHANGEABLE LENS AND ACCESSORY

BACKGROUND OF THE INVENTION

Field of the Invention

The present invention relates to an interchangeable lens and an accessory.

Description of the Related Art

In a lens interchangeable type camera system, the camera communicates commands, data, etc. with the mounted interchangeable lens, and the communication method may differ depending on the type of interchangeable lens. Japanese Patent Laid-Open No. 2014-134807 discloses a system in which a camera mountable with a plurality of types of interchangeable lenses communicates with the interchangeable lens using the communication method notified from the mounted interchangeable lens.

In lens interchangeable type camera systems, an accessory, such as a wide converter and an extender, may be attached to the interchangeable lens. Then, information on the accessory mounted with the camera may not be acquired depending on the communication method and the attached device. If the information on the accessory mounted with the camera is unavailable, various parameters cannot be properly corrected according to optical information that changes due to the attachment of the accessory.

SUMMARY OF THE INVENTION

The present invention provides an interchangeable lens, which can inform optical information that changes when an accessory is attached.

An interchangeable lens according to one aspect of the present invention is communicable with an accessory and an image pickup apparatus and includes a communicator configured to communicate with the accessory and the image pickup apparatus, and a memory configured to store information corresponding to a type of accessory. The communicator acquires information on the type of the accessory by communicating with the accessory, and transmits optical information corresponding to the type of the accessory to the image pickup apparatus.

An accessory according to another aspect of the present invention is attachable to an interchangeable lens and includes a communicator configured to communicate with the interchangeable lens. The communicator transmits information on the accessory to the interchangeable lens by communicating with the interchangeable lens, and the information on the accessory is information on a type of the accessory or optical information on the accessory.

Further features of the present invention will become apparent from the following description of exemplary embodiments with reference to the attached drawings.

DESCRIPTION OF THE EMBODIMENTS

Figure 1A:
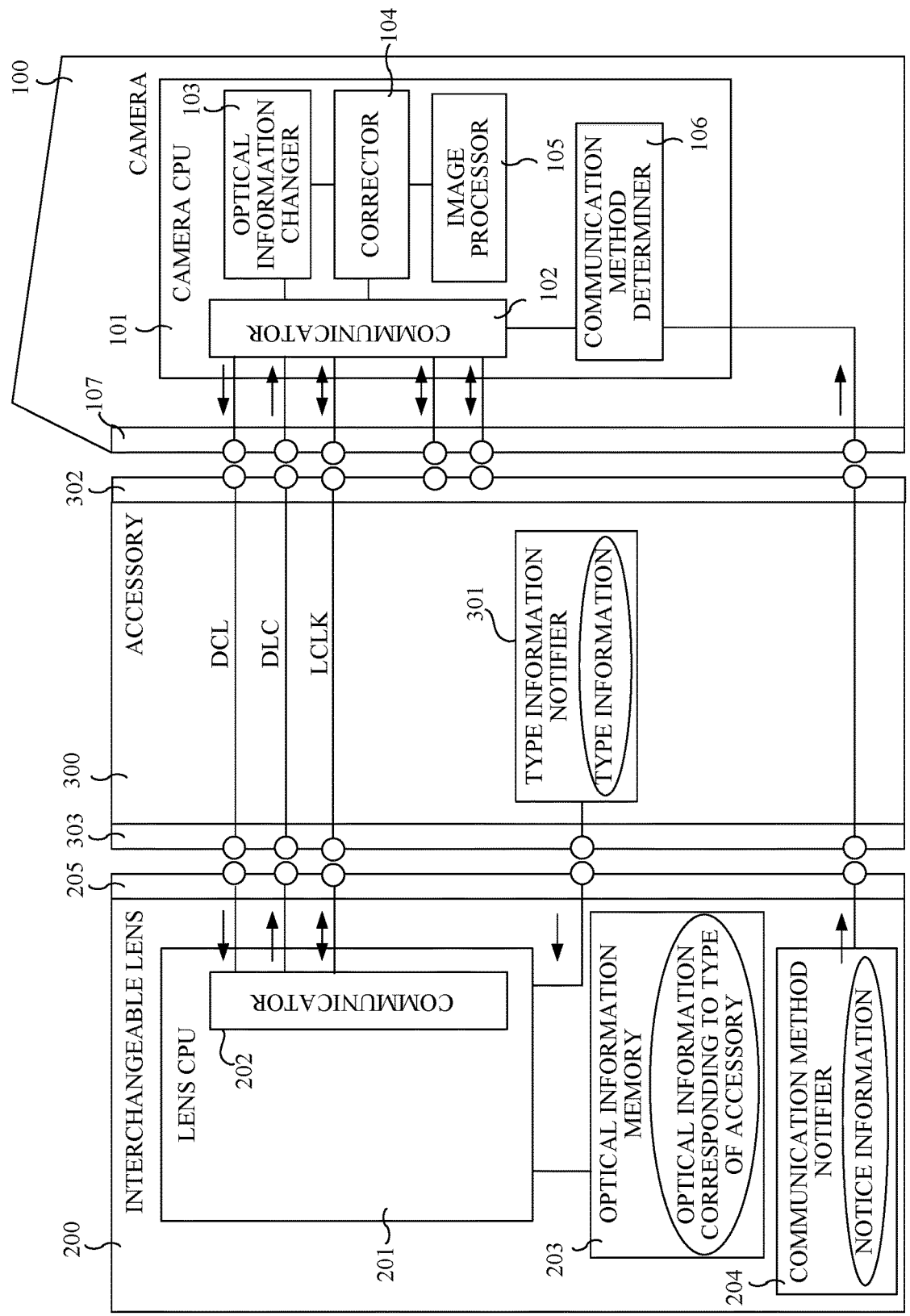
FIGS. 1A and 1B are block diagrams of a lens interchangeable type camera system according to a first embodiment.

Referring now to the accompanying drawings, a detailed description will be given of embodiments according to the present invention. Corresponding elements in respective figures will be designated by the same reference numerals, and a duplicate description thereof will be omitted.

In a lens interchangeable type camera system (camera system hereinafter) according to this embodiment, a camera can communicate with an interchangeable lens using a first communication method or a second communication method. The first communication method is a communication method that uses both a first communication that relates to a communication between the camera and the interchangeable lens and a second communication that relates to communications among the camera, an accessory, and the interchangeable lens. The second communication method uses only the first communication. The first communication is a CLK (clock) synchronous communication, executed with three communication lines (first communication line group): DCL as a data line from the camera to the interchangeable lens, DLC as a data line from the interchangeable lens to the camera, and LCLK as a CLK line. The second communication is an asynchronous communication executed with two communication lines (second communication line group): DCA as a data line for a mutual communication, and CS as a chip select line.

The present invention is applied when the camera and the interchangeable lens communicate with each other using the second communication method, and can properly correct various parameters according to optical information that changes due to the attachment of the accessory.

First Embodiment

FIG. 1A is a block diagram of a camera system according to this embodiment. The camera system includes a camera (image pickup apparatus) 100, an interchangeable lens 200, and an accessory 300. The interchangeable lens 200 can communicate with the camera 100 and the accessory 300. Although the accessory 300 is mounted between the camera 100 and the interchangeable lens 200 in this embodiment, it may be mounted on the object side of the interchangeable lens 200.

The camera 100 has a camera CPU 101, and is mountable with an interchangeable lens 200 or an accessory 300 via a camera mount 107. The camera CPU 101 includes a communicator (communication unit) 102, an optical information changer (optical information changing unit) 103, a corrector (correction nit) 104, an image processor (image processing unit) 105, and a communication method determiner (communication method determining unit) 106. The communicator 102 communicates with the interchangeable lens 200. The optical information changer 103 changes the acquired optical information. The corrector 104 corrects various parameters using the optical information. The image processor 105 performs image processing using various corrected parameters. The communication method determiner 106 determines the communication method using the notified information from the interchangeable lens 200.

The interchangeable lens 200 includes a lens CPU 201, an optical information memory 203, and a communication method notifier (communication method notifying unit) 204, and is mountable to the camera 100 or the accessory 300 via a lens mount 205. The lens CPU 201 has a communicator (communication unit) 202 for communicating with the camera 100. The optical information memory 203 stores optical information corresponding to the type of accessory. Here, the optical information corresponding to the type of accessory is optical information in which the optical information of the accessory 300 is added to the optical information of the interchangeable lens 200. The communication method notifier 204 notifies the camera 100 of information (notice information) on the communication method used in the communicator 202.

The accessory 300 includes a type information notifier (type information notifying unit, communicator) 301, and is attachable to the camera 100 via a lens mount 302 and attachable to the interchangeable lens 200 via a lens mount 303. The type information notifier 301 notifies the lens CPU 201 of information (type information) on the type of the accessory 300.

Figure 2:
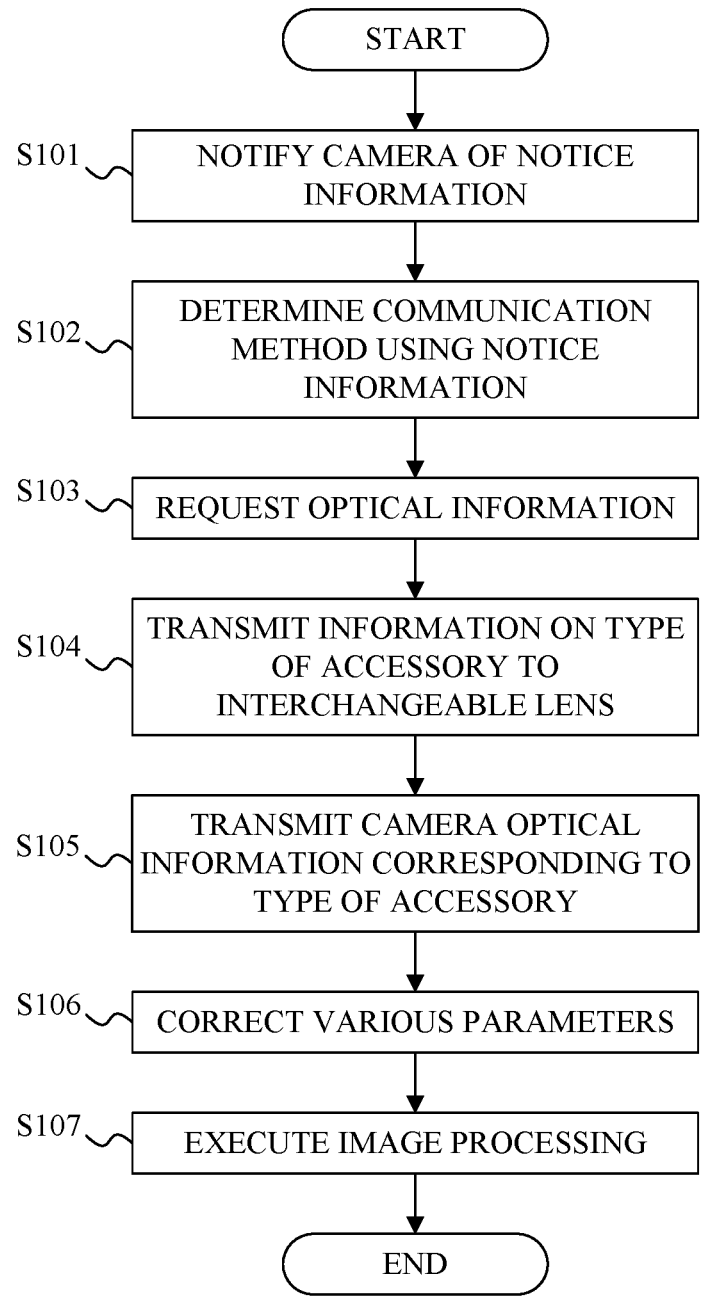
FIG. 2 is a flowchart from a determination of a communication method of the lens interchangeable type camera system according to the first embodiment to image processing.

FIG. 2 is a flowchart from a determination of the communication method of the camera system according to this embodiment to image processing.

In the step S101, the communication method notifier 204 notifies the camera 100 of information (notice information) on the communication method used in the communicator 202.

In the step S102, the communication method determiner 106 determines the communication method to be implemented, using the notice information acquired from the interchangeable lens 200. In this embodiment, the communication method determiner 106 determines that the second communication method is to be implemented.

In the step S103, the camera CPU 101 requests the interchangeable lens 200 for optical information via the communicator 102.

In the step S104, the type information notifier 301 transmits the information on the type of the accessory 300 to the interchangeable lens 200.

In the step S105, the lens CPU 201 acquires the optical information corresponding to the type of the accessory 300 from the optical information memory 203, and transmits the optical information corresponding to the type of the accessory 300 to the camera 100 via the communicator 202.

In the step S106, the corrector 104 corrects various parameters using the optical information corresponding to the type of the accessory 300.

In the step S107, the image processor 105 performs image processing using various parameters.

As described above, the configuration according to this embodiment can notify optical information that changes due to the attachment of the accessory. Thereby, various parameters can be properly corrected according to the optical information that changes due to the attachment of the accessory.

Figure 1B:
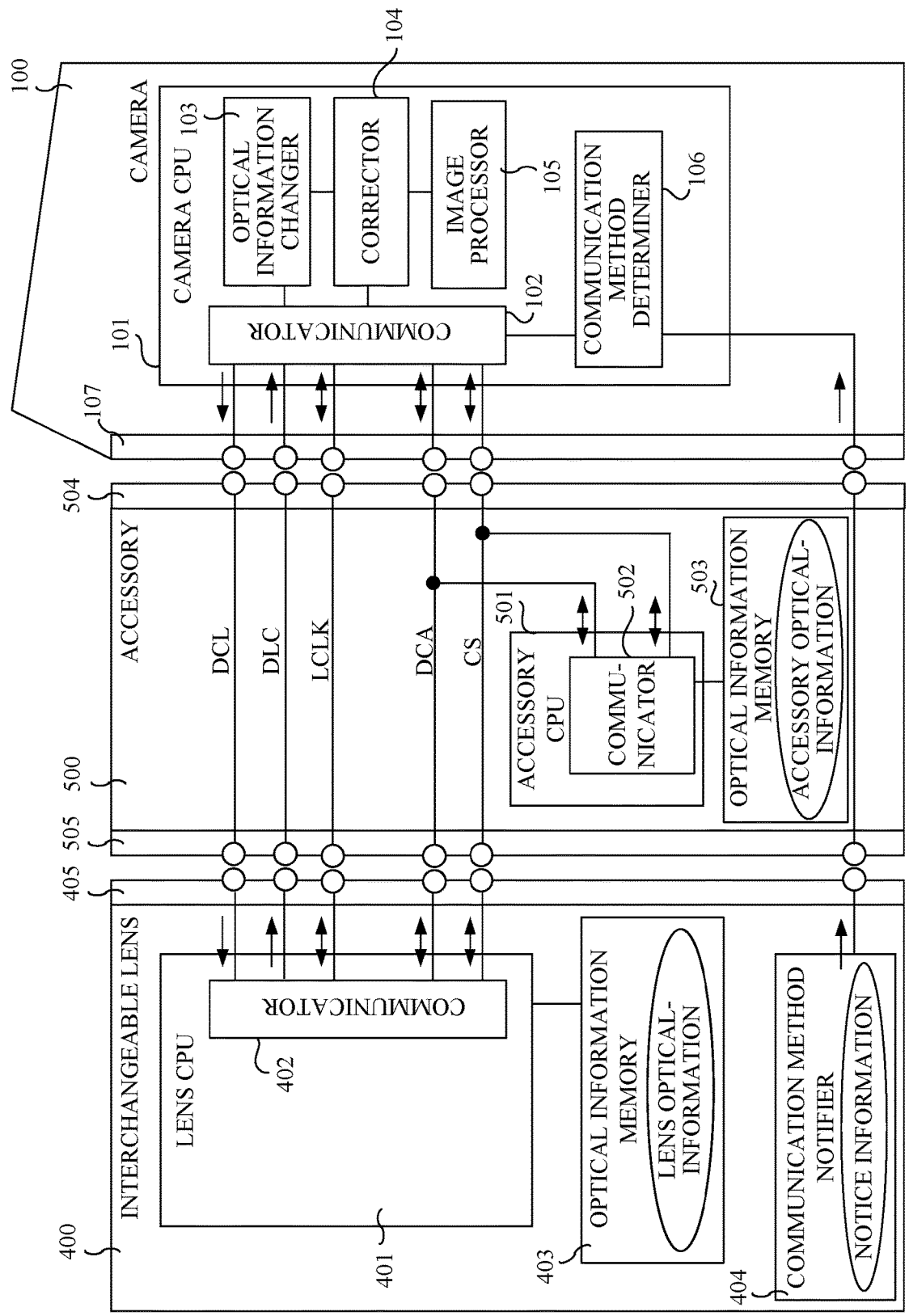

As described above, the camera 100 according to this embodiment can communicate with the interchangeable lens through the first communication method. FIG. 1B illustrates a camera system having a communicable configuration through the first communication method. The camera system includes the camera 100, the interchangeable lens 400, and the accessory 500. The interchangeable lens 400 has the lens CPU 401, the optical information memory 403, and the communication method notifier 404, and is attachable to the camera 100 or the accessory 300 via the lens mount 405. The lens CPU 401 includes the communicator 402 for communicating with the camera 100. The optical information memory 403 stores the optical information (lens optical-information) of the interchangeable lens 400. The communication method notifier 404 notifies the camera 100 of information (notice information) on the communication method used in the communicator 402. The accessory 500 includes the accessory CPU 501 that includes the communicator 502 for communicating with the camera 100, and the optical information memory 503 that stores optical information (accessory optical-information) of the accessory 500. The accessory 500 is attachable to the camera 100 via the lens mount 504, and attachable to the interchangeable lens 400 via the lens mount 505.

In the camera system illustrated in FIG. 1B, when the camera 100 requests the optical information, the communicator 402 transmits the lens optical-information to the camera 100 using the first communication. The communicator 502 transmits the accessory optical-information to the camera 100 using the second communication. When the camera 100 acquires the lens optical-information and the accessory optical-information, the optical information changer 103 changes the lens optical-information using the accessory optical-information. Thereafter, the corrector 104 corrects various parameters using the changed optical information, and the image processor 105 performs image processing using the various parameters.

Second Embodiment

Figure 3:
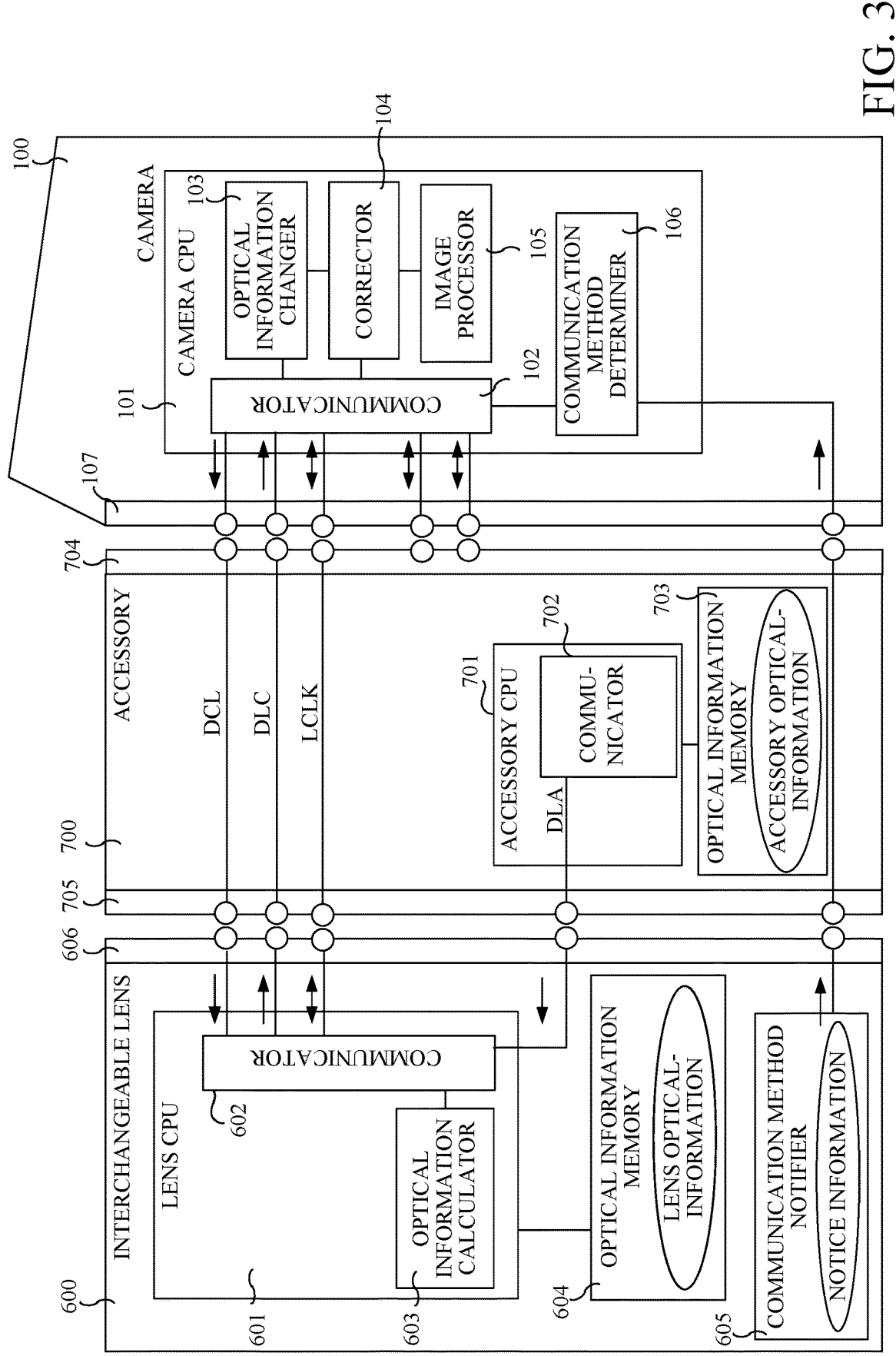
FIG. 3 is a block diagram of a lens interchangeable type camera system according to a second embodiment.

FIG. 3 is a block diagram of a camera system according to this embodiment. The camera system includes a camera (image pickup apparatus) 100, an interchangeable lens 600, and an accessory 700. The interchangeable lens 600 can communicate with the camera 100 and the accessory 700. Although the accessory 700 is mounted between the camera 100 and the interchangeable lens 600 in this embodiment, it may be mounted on the object side of the interchangeable lens 600.

The interchangeable lens 600 includes a lens CPU 601, an optical information memory 604, and a communication method notifier 605, and is attachable to the camera 100 or the accessory 700 via a lens mount 606. The lens CPU 601 includes a communicator 602 for communicating with the camera 100, and an optical information calculator (optical information calculating unit) 603 for calculating combined optical information (combined information) in which the optical information of the interchangeable lens 600 and the optical information of the accessory 700 are combined. The optical information memory 604 stores the optical information (lens optical-information) of the interchangeable lens 200. The communication method notifier 605 notifies the camera 100 of information (notice information) on the communication method used in the communicator 602.

The accessory 700 includes an accessory CPU 701 and an optical information memory 703, and is attachable to the camera 100 via a lens mount 704, and attachable to the interchangeable lens 600 via a lens mount 705. The accessory CPU 701 includes a communicator 702 for communicating with the interchangeable lens 600. The optical information memory 703 stores the optical information (accessory optical-information) of the accessory 700.

Figure 4:
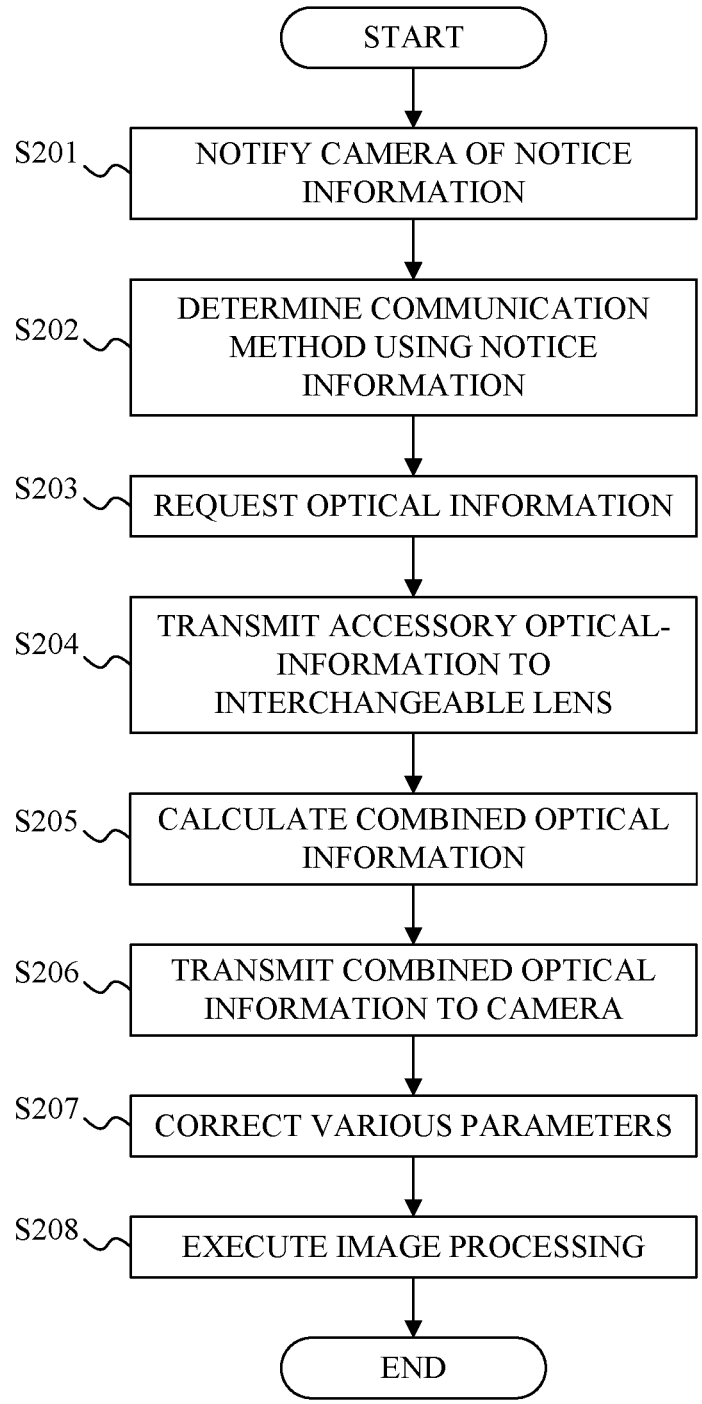
FIG. 4 is a flowchart from a determination of a communication method of the lens interchangeable type camera system according to the second embodiment to image processing.

FIG. 4 is a flowchart from a determination of the communication method of the camera system according to this embodiment to image processing.

In the step S201, the communication method notifier 605 notifies the camera 100 of information (notice information) on the communication method used in the communicator 602.

In the step S202, the communication method determiner 106 determines the communication method to be implemented, using the notice information acquired from the interchangeable lens 600. In this embodiment, the communication method determiner 106 determines that the second communication method is to be implemented.

In the step S203, the camera CPU 101 requests the interchangeable lens 600 for optical information via the communicator 102.

In the step S204, the accessory CPU 701 transmits the accessory optical-information to the interchangeable lens 600 via the communicator 702.

In the step S205, the optical information calculator 603 calculates combined optical information using the lens optical-information acquired from the optical information memory 604 and the accessory optical-information acquired from the accessory CPU 701 via the communicator 602.

In the step S206, the lens CPU 601 transmits the combined optical information to the camera 100 via the communicator 602.

In the step S207, the corrector 104 corrects various parameters using the combined optical information.

In the step S208, the image processor 105 performs image processing using various parameters.

As described above, the configuration according to this embodiment can notify the optical information that changes due to the attachment of the accessory. Thereby, various parameters can be properly corrected according to the optical information that changes due to the attachment of the accessory.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-119885, filed on Jul. 13, 2020, which is hereby incorporated by reference herein in its entirety.

What is claimed is:

1. An interchangeable lens comprising:
   a communicator configured to communicate with an accessory mounted to the interchangeable lens and an image pickup apparatus; and
   a memory configured to store a plurality of optical information corresponding to a plurality of types of accessories mountable to the interchangeable lens,
   wherein the communicator is further configured to:
      acquire information on a type of the accessory mounted to the interchangeable lens by communicating with the accessory;
      acquire optical information corresponding to the type of the accessory mounted to the interchangeable lens from the memory on the basis of the information on the type of the accessory; and
      transmit the optical information corresponding to the type of the accessory mounted to the interchangeable lens to the image pickup apparatus.

2. The interchangeable lens according to claim 1, further comprising a notifier configured to inform the image pickup apparatus of information on a communication method used in the communicator.

3. The interchangeable lens according to claim 1, wherein the interchangeable lens is attachable to the image pickup apparatus via the accessory.

4. The interchangeable lens according to claim 1,
   wherein the interchangeable lens is communicable with the image pickup apparatus using a first communication method via a first communication line group, and
   wherein the communication with the accessory is executed using a second communication method via a second communication line group which is different from the first data line group.

5. The interchangeable lens according to claim 4, wherein the first communication line group consists of 3 lines and the second communication line group consists of 2 data lines.

6. An accessory attachable to the interchangeable lens according to claim 1, the accessory comprising a communicator configured to communicate with the interchangeable lens,
   wherein the communicator transmits information on the type of the accessory to the interchangeable lens.

* * * * *